United States Patent
Sohn et al.

(10) Patent No.: US 12,469,566 B2
(45) Date of Patent: Nov. 11, 2025

(54) MEMORY DEVICE PERFORMING READ OPERATION AND METHOD OF OPERATING THE SAME

(71) Applicant: SK hynix Inc., Icheon-si (KR)

(72) Inventors: Hyeok Chan Sohn, Icheon-si (KR); Beom Ju Shin, Icheon-si (KR); Byung Ryul Kim, Icheon-si (KR); Kang Wook Jo, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 251 days.

(21) Appl. No.: 18/325,730

(22) Filed: May 30, 2023

(65) Prior Publication Data

US 2024/0185929 A1    Jun. 6, 2024

(30) Foreign Application Priority Data

Dec. 2, 2022  (KR) ........................ 10-2022-0166957

(51) Int. Cl.
*G11C 11/34* (2006.01)
*G11C 16/12* (2006.01)
*G11C 16/26* (2006.01)

(52) U.S. Cl.
CPC .............. *G11C 16/26* (2013.01); *G11C 16/12* (2013.01)

(58) Field of Classification Search
CPC ................................ G11C 16/26; G11C 16/12
USPC .................................................. 365/185.21
See application file for complete search history.

(56) References Cited

U.S. PATENT DOCUMENTS

| | | | |
|---|---|---|---|
| 8,934,727 B2 * | 1/2015 | Shiraishi | H04N 1/415 |
| | | | 382/246 |
| 10,937,517 B1 * | 3/2021 | Rich-Plotkin | G11C 29/028 |
| 11,367,505 B2 * | 6/2022 | You | G11C 11/5642 |
| 11,508,453 B2 * | 11/2022 | Johnson | G06F 11/1048 |
| 11,538,546 B2 * | 12/2022 | Johnson | G11C 29/76 |
| 11,733,921 B2 * | 8/2023 | Choi | G11C 16/10 |
| | | | 711/154 |
| 11,847,342 B2 * | 12/2023 | Tishbi | G06F 21/79 |
| 11,887,673 B2 * | 1/2024 | Kim | G11C 16/0483 |
| 11,915,778 B2 * | 2/2024 | Arizono | G11C 16/26 |
| 11,971,826 B2 * | 4/2024 | Hsu | G06F 12/0893 |
| 11,971,829 B2 * | 4/2024 | Hsu | G11C 16/0483 |
| 12,057,188 B2 * | 8/2024 | Bassa | G11C 7/1039 |
| 2017/0046220 A1 * | 2/2017 | Sharon | G06F 3/0679 |
| 2017/0123902 A1 * | 5/2017 | Ravimohan | G11C 29/52 |
| 2019/0295655 A1 * | 9/2019 | Shin | G11C 11/5628 |
| 2023/0090999 A1 * | 3/2023 | Umehara | G01R 33/0052 |
| | | | 324/200 |

(Continued)

FOREIGN PATENT DOCUMENTS

KR    1020110124632 A    11/2011
KR    1020200054000 A    5/2020

*Primary Examiner* — Viet Q Nguyen
(74) *Attorney, Agent, or Firm* — WILLIAM PARK AND ASSOCIATES LTD.

(57) ABSTRACT

The present technology relates to an electronic device. A memory device according to the present technology may include a first plane, a second plane, a data input/output circuit, and an encoder. The data input/output circuit may output data read from the first and second planes. The encoder may compress second data read from the second plane while first data read from the first plane is being output. The data input/output circuit may output the compressed second data after outputting the first data.

20 Claims, 11 Drawing Sheets

(56) References Cited

U.S. PATENT DOCUMENTS

| | | | | |
|---|---|---|---|---|
| 2023/0317144 A1* | 10/2023 | Ha | ............. | G11C 5/145 365/189.011 |
| 2024/0302992 A1* | 9/2024 | Sohn | ............. | G06F 3/0679 |

* cited by examiner

MEMORY DEVICE PERFORMING READ OPERATION AND METHOD OF OPERATING THE SAME

CROSS-REFERENCE TO RELATED APPLICATION

The present application claims priority under 35 U.S.C. § 119(a) to Korean patent application number 10-2022-0166957 filed on Dec. 2, 2022, in the Korean Intellectual Property Office, the entire disclosure of which is incorporated by reference herein.

BACKGROUND

1. Technical Field

The present disclosure relates to an electronic device, and more particularly, to a memory device and a method of operating the same.

2. Related Art

A storage device is a device that stores data under the control of a host device, such as a computer or a smartphone. The storage device may include a memory device in which data is stored and a memory controller controlling the memory device. The memory device is classified into a volatile memory device and a nonvolatile memory device.

A volatile memory device is a memory device in which data is stored only when power is supplied and the stored data is erased when power is cut off. The volatile memory device includes a static random access memory (SRAM), a dynamic random access memory (DRAM), and the like.

A nonvolatile memory device is a memory device in which data is not erased even though power is cut off, and include a read only memory (ROM), a programmable ROM (PROM), an electrically programmable ROM (EPROM), an electrically erasable and programmable ROM (EEPROM), a flash memory, and the like.

The memory device may perform a cache read operation. The memory device may output hard data and soft data stored in a plane. The memory device may reduce a read time by performing the cache read operation on the hard data and the soft data stored in the plane.

SUMMARY

According to an embodiment of the present disclosure, a memory device may include a first plane, a second plane, a data input/output circuit, and an encoder. The data input/output circuit may output data read from the first and second planes. The encoder may compress second data read from the second plane while first data read from the first plane is being output. The data input/output circuit may output the compressed second data after outputting the first data.

According to an embodiment of the present disclosure, a method of operating a memory device may include outputting first data read from a first plane, compressing second data read from a second plane while the first data is being output, and outputting the compressed second data after outputting the first data.

DETAILED DESCRIPTION

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and should not be construed as being limited to the embodiments described in the present specification or application.

An embodiment of the present disclosure provides a memory device and a method of operating the same of which cache read performance is improved.

According to the present technology, a memory device and a method of operating the same of which cache read performance is improved are provided.

Figure 1:
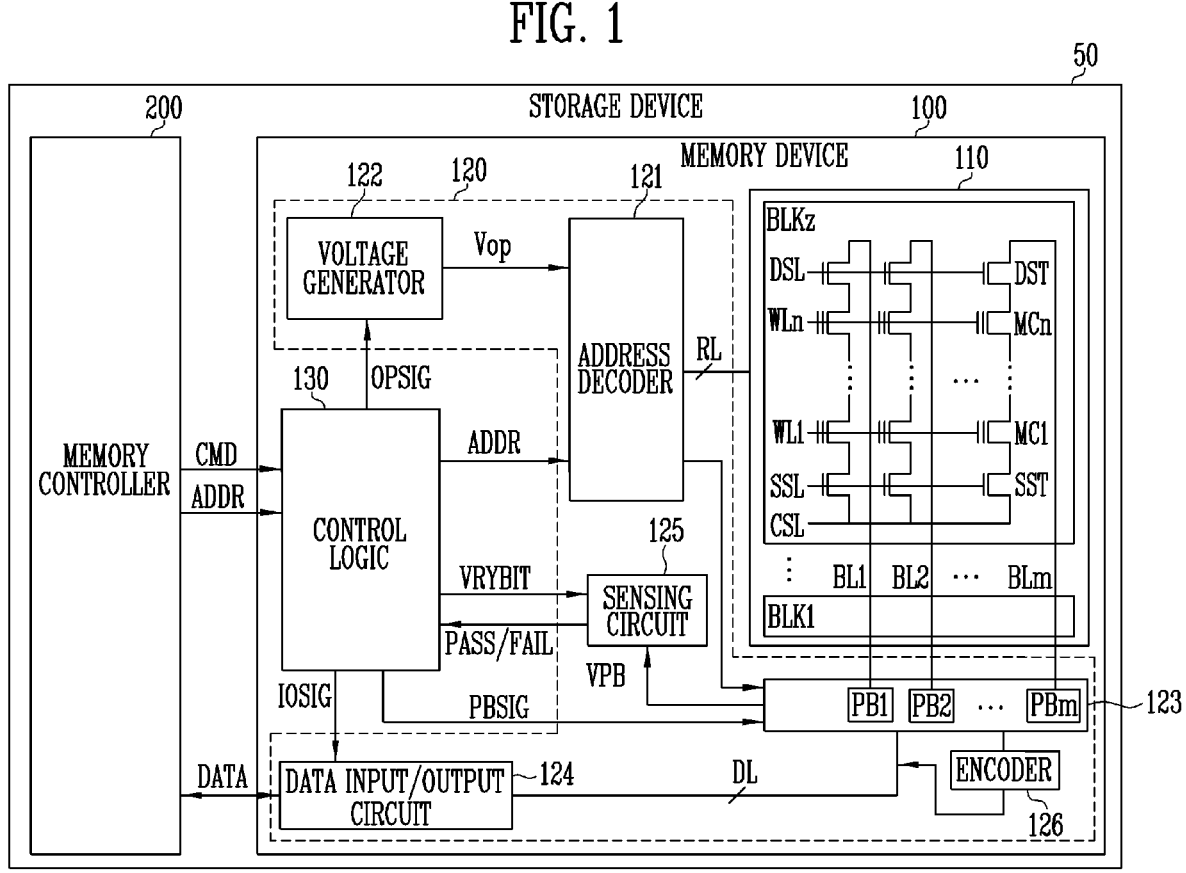
FIG. 1 is a diagram illustrating a storage device according to an embodiment of the present disclosure.

FIG. 1 is a diagram illustrating a storage device according to an embodiment of the present disclosure.

Referring to FIG. 1, the storage device 50 may include a memory device 100 and a memory controller 200. The storage device 50 may be a device that stores data under the control of a host, such as a mobile phone or a computer. The storage device 50 may be manufactured as various types of storage devices, such as a solid state drive (SSD) and a universal flash storage (UFS), according to a host interface, which is a communication method with the host. The storage device 50 may be manufactured as various types of package forms, such as a system on chip (SOC).

The memory device 100 may store data. The memory device 100 may operate under the control of the memory controller 200. In an embodiment, the memory device 100 may be a nonvolatile memory device or a volatile memory device.

The memory device 100 may be configured to receive a command CMD and an address ADDR from the memory controller 200 and may access an area of a memory cell array 110 selected by the address ADDR. The memory device 100 may perform an operation instructed by the command CMD on the area selected by the address ADDR. For example, the memory device 100 may perform a write operation (program operation), a read operation, and an erase operation. The memory device 100 may program, read, or erase data in the area selected by the address ADDR.

In an embodiment, the memory device 100 may include the memory cell array 110, a peripheral circuit 120, and a control logic 130.

The memory cell array 110 may include a plurality of memory blocks BLK1 to BLKz. The plurality of memory blocks BLK1 to BLKz may be connected to an address decoder 121 through row lines RL. The plurality of memory blocks BLK1 to BLKz may be connected to a read and write circuit 123 through bit lines BL1 to BLm. Each of the plurality of memory blocks BLK1 to BLKz may include a plurality of memory cells. As an embodiment, the plurality of memory cells may be nonvolatile memory cells.

In an embodiment, any one memory block BLKz, among the plurality of memory blocks BLK1 to BLKz, may include a plurality of word lines WL1 to WLn arranged parallel to each other between a drain select line DSL and a source select line SSL. The memory block BLKz may include a plurality of memory cell strings connected between any one bit line and a common source line CSL. The bit lines BL1 to BLm may be connected to the plurality of memory cell strings, respectively, and the common source line CSL may be commonly connected to the plurality of memory cell strings.

For example, the memory cell string may include a drain select transistor DST, a plurality of memory cells MC1 to MCn, and a source select transistor SST connected in series between the common source line CSL and a first bit line BL1. One memory cell string may include at least one drain select transistor DST and at least one source select transistor SST.

A drain of the drain select transistor DST may be connected to the first bit line BL1 and a source of the source select transistor SST may be connected to the common source line CSL. The plurality of memory cells MC1 to MCn may be connected in series between the drain select transistor DST and the source select transistor SST. Gates of the source select transistors SST included in different memory cell strings may be connected to the source select line SSL. Gates of the drain select transistors DST may be connected to the drain select line DSL. Gates of the plurality of memory cells MC1 to MCn may be connected to the plurality of word lines WL1 to WLn. Among memory cells included in different memory cell strings, memory cells connected to the same word line may be defined as a physical page PG. The memory block BLKz may include physical pages of the number corresponding to the number of the plurality of word lines WL1 to WLn.

The memory cells MC1 to MCn may be configured as a single level cell (SLC) that stores one bit of data, a multi-level cell (MLC) that stores two bits of data, a triple level cell (TLC) that stores three bits of data, a quad level cell (QLC) capable of storing four bits of data, or memory cells capable of storing five or more bits of data.

One physical page may store as many logical page data as the number of bit data that each of the memory cells may store. For example, when memory cells are configured as TLCs, one physical page may store three logical page data.

The peripheral circuit 120 may drive the memory cell array 110. For example, the peripheral circuit 120 may drive the memory cell array 110 to perform the program operation, the read operation, and the erase operation. As another example, the peripheral circuit 120 may apply various operations voltages to the row lines RL and the bit lines BL1 to BLm or may discharge the applied voltages according to control of the control logic 130.

The peripheral circuit 120 may include the address decoder 121, a voltage generator 122, the read and write circuit 123, a data input/output circuit 124, a sensing circuit 125, and an encoder 126.

The address decoder 121 may be connected to the memory cell array 110 through the row lines RL. The row lines RL may include the drain select lines DSL, the plurality of word lines WL1 to WLn, the source select lines SSL, and the common source line CSL.

The address decoder 121 may be configured to operate in response to the control of the control logic 130. The address decoder 121 may receive the address ADDR from the control logic 130.

The address decoder 121 may be configured to decode a block address of the received address ADDR. The address decoder 121 may select at least one memory block among the memory blocks BLK1 to BLKz according to the decoded block address. The address decoder 121 may be configured to decode a row address of the received address ADDR. The address decoder 121 may select at least one word line of the selected memory block by applying voltages provided from the voltage generator 122 to at least one word line WL according to the decoded row address.

During the program operation, the address decoder 121 may apply a program voltage to a selected word line and may apply a pass voltage of a level lower than that of the program voltage to unselected word lines. During a program verify operation, the address decoder 121 may apply a verify voltage to the selected word line and may apply a verify pass voltage having a higher voltage level than the verify voltage to the unselected word lines.

During the read operation, the address decoder 121 may apply a read voltage to the selected word line and may apply a read pass voltage having a higher voltage level than the read voltage to the unselected word lines.

The address decoder 121 may be configured to decode a column address of the transferred address ADDR. The decoded column address may be transferred to the read and write circuit 123. For example, the address decoder 121 may include components, such as a row decoder, a column decoder, and an address buffer.

The voltage generator 122 may be configured to generate a plurality of operation voltages Vop by using an external power voltage supplied to the memory device 100. The voltage generator 122 may operate in response to the control of the control logic 130.

As an embodiment, the voltage generator 122 may generate an internal power voltage by regulating the external power voltage. The internal power voltage generated by the voltage generator 122 may be used as an operation voltage of the memory device 100.

As an embodiment, the voltage generator 122 may generate the various operation voltages Vop used for the program, read, and erase operations in response to an operation signal OPSIG. The voltage generator 122 may generate the plurality of operation voltages Vop by using the external power voltage or the internal power voltage. The voltage generator 122 may be configured to generate various voltages required by the memory device 100. For example, the voltage generator 122 may generate a plurality of erase voltages, a plurality of program voltages, a plurality of pass voltages, a plurality of selection read voltages, and a plurality of non-selection read voltages.

The voltage generator 122 may include a plurality of pumping capacitors receiving the internal power voltage in order to generate the plurality of operation voltages Vop having various voltage levels and may generate the plurality of operation voltages Vop by selectively activating the plurality of pumping capacitors in response to the control of the control logic 130.

The plurality of generated operation voltages Vop may be supplied to the memory cell array 110 by the address decoder 121.

The read and write circuit 123 may include first to m-th page buffers PB1 to PBm. The first to m-th page buffers PB1 to PBm may be connected to the memory cell array 110 through first to m-th bit lines BL1 to BLm, respectively. The first to m-th page buffers PB1 to PBm may operate in response to the control of the control logic 130.

The first to m-th page buffers PB1 to PBm may communicate data DATA with the data input/output circuit 124. During programming, the first to m-th page buffers PB1 to PBm may receive the data DATA to be stored through the data input/output circuit 124 and data lines DL.

During the program verify operation, the first to m-th page buffers PB1 to PBm may read the data DATA stored in the memory cells from selected memory cells through the bit lines BL1 to BLm.

During the read operation, the read and write circuit 123 may read the data DATA from memory cells of a selected page through the bit lines BL1 to BLm and may store the read data DATA to the first to m-th page buffers PB1 to PBm.

The data input/output circuit 124 may be connected to the first to m-th page buffers PB1 to PBm through the data lines DL. The data input/output circuit 124 may operate in response to the control of the control logic 130. During the read operation, the data input/output circuit 124 may output the data DATA transferred from the first to m-th page buffers PB1 to PBm included in the read and write circuit 123 to the memory controller 200.

During the read operation or a program verify operation, the sensing circuit 125 may generate a reference current in response to a signal of an allowable bit VRYBIT generated by the control logic 130 and may compare a sensing voltage VPB received from the read and write circuit 123 with a reference voltage generated by the reference current to output a pass signal or a fail signal to the control logic 130. For example, the sensing circuit 125 may output the pass signal to the control logic 130 when a magnitude of the sensing voltage VPB is less than the reference voltage. As another example, the sensing circuit 125 may output the fail signal to the control logic 130 when the magnitude of the sensing voltage VPB is greater than the reference voltage.

The encoder 126 may encode and compress the data received from the read and write circuit 123. The encoder 126 may output the compressed data to the data input/output circuit 124 through the data lines DL.

The control logic 130 may be connected to the address decoder 121, the voltage generator 122, the read and write circuit 123, the data input/output circuit 124, the sensing circuit 125, and the encoder 126. The control logic 130 may be configured to control an overall operation of the memory device 100. The control logic 130 may operate in response to the command CMD transferred from an external device.

The control logic 130 may control the peripheral circuit 120 by generating various signals in response to the command CMD and the address ADDR. For example, the control logic 130 may generate the operation signal OPSIG, the address ADDR, a read and write control signal PBSIG, and the allowable bit VRYBIT in response to the command CMD and the address ADDR. The control logic 130 may output the operation signal OPSIG to the voltage generator 122, output the address ADDR to the address decoder 121, output the read and write control signal PBSIG to the read and write circuit 123, and output the allowable bit VRYBIT to the sensing circuit 125. In addition, the control logic 130 may determine whether a verify operation passes or fails in response to the pass or fail signal PASS/FAIL output from the sensing circuit 125.

In an embodiment, the read and write circuit 123 may sense first data and third data stored in a first plane. The first data and the third data may be data sensed from the same page of the first plane. The first data may be hard data obtained using a default read voltage. The third data may be soft data obtained using a soft read voltage determined based on the default read voltage.

The read and write circuit 123 may sense second data and fourth data stored in a second plane. The second data and the fourth data may be data sensed from the same page of the second plane. The second data may be soft data obtained using the soft read voltage determined based on the default read voltage. The fourth data may be hard data obtained using the default read voltage.

The read and write circuit 123 may output the first data and the fourth data to the data input/output circuit 124. The read and write circuit 123 may output the second data and the third data to the encoder 126.

The read and write circuit 123 may sense the third data from the first plane and sense the fourth data from the second plane while compressed second data is being output from the data input/output circuit 124 to the external controller.

In an embodiment, the read and write circuit 123 may include a first page buffer group that senses data stored in the first plane and a second page buffer group that senses data stored in the second plane. The first page buffer group may sense the first data from the first plane while the second page buffer group senses the second data from the second plane.

The first page buffer group may include a main latch and a cache latch. The main latch of the first page buffer group may sense the first data stored in the selected page of the first plane. When the first data is stored in the cache latch, the main latch may sense the third data stored in the selected page. The cache latch of the first page buffer group may store the first data received from the main latch and may output the first data to the data input/output circuit 124.

The second page buffer group may include a main latch and a cache latch. The main latch of the second page buffer group may sense the second data stored in the selected page of the second plane. When the second data is stored in the cache latch, the main latch may sense the fourth data stored in the selected page. The cache latch of the second page buffer group may store the second data received from the main latch and may output the second data to the data input/output circuit 124.

The data input/output circuit 124 may output data read from the first plane and the second plane to the external controller.

The data input/output circuit 124 may output the first data read from the first plane and the fourth data read from the second plane. For example, the data input/output circuit 124 may output the first data and the fourth data received from the read and write circuit 123. The data input/output circuit 124 may output the compressed second data and compressed third data received from the encoder 126. At this time, the data input/output circuit 124 may output the compressed second data after outputting the first data. The data input/output circuit 124 may output the compressed third data after outputting the fourth data.

While the first data read from the first plane is being output from the data input/output circuit 124 to the external controller, the encoder 126 may compress the second data received from the read and write circuit 123 and read from the second plane. While the fourth data read from the second plane is being output from the data input/output circuit 124 to the external controller, the encoder 126 may compress the third data received from the read and write circuit 123 and read from the first plane. The third data may be soft data corresponding to the first data that is hard data, and the fourth data may be hard data corresponding to the second data that is soft data.

The memory controller 200 may control an overall operation of the storage device 50.

The memory controller 200 may control the memory device 100 to perform the write operation, the read operation, the erase operation, or the like according to a request of the host. The memory controller 200 may provide the command, a physical block address, or the data to the memory device 100 according to the write operation, the read operation, or the erase operation.

In an embodiment, the memory controller 200 may generate the command, the address, and the data and may transmit the command, the address, and the data to the memory device 100 independently, regardless of the request from the host. For example, the memory controller 200 may provide the command CMD, the address ADDR, and the data DATA for performing the read operation and the write operations involved in performing wear leveling, read reclaim, garbage collection, and the like, to the memory device 100.

The host may communicate with the storage device 50 using various communication methods, such as a dual in-line memory module (DIMM).

Figure 2:
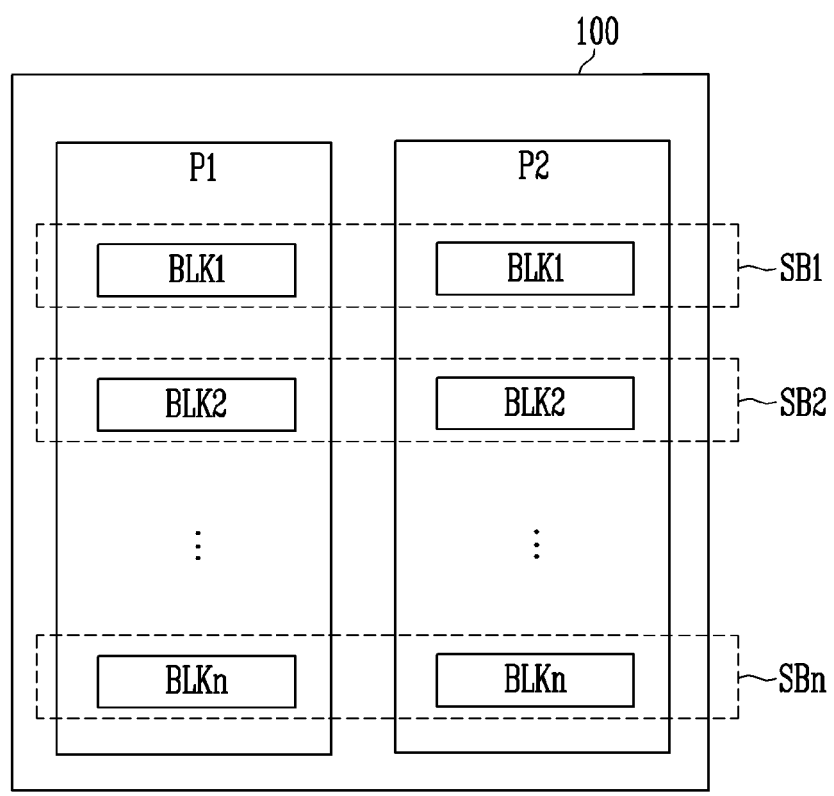
FIG. 2 is a diagram illustrating a plane of a memory device.

FIG. 2 is a diagram illustrating a plane of the memory device.

Referring to FIG. 2, the memory device 100 may include a plurality of planes P1 and P2. One plane may include a plurality of memory blocks BLK1 to BLKn (n is a positive integer). The number of planes included in one memory device is not limited by the present embodiment.

The plane may be a unit independently performing the program operation, the read operation, or the erase operation. Therefore, the memory device 100 may include the address decoder 121 and the read and write circuit 123, which are described with reference to FIG. 1, corresponding to each plane.

In an embodiment, a super block may include at least two or more memory blocks included in different planes, among memory blocks respectively included in a plurality of planes.

For example, first memory blocks BLK1 included in each of the plurality of planes P1 and P2 may be allocated as a first super block SB1. Second memory blocks BLK2 included in each of the plurality of planes P1 and P2 may be allocated as a second super block SB2. In a similar method, n-th memory blocks BLKn included in each of the plurality of planes P1 and P2 may be allocated as an n-th super block SBn. Therefore, the plurality of planes P1 and P2 included in one memory device may include first to n-th super blocks SB1 to SBn.

The memory device 100 may perform a memory operation on the memory blocks allocated to the super block for each plane in parallel. This may be a multi-plane operation. The memory operation may be the read operation, the program operation, or the erase operation.

Figure 3:
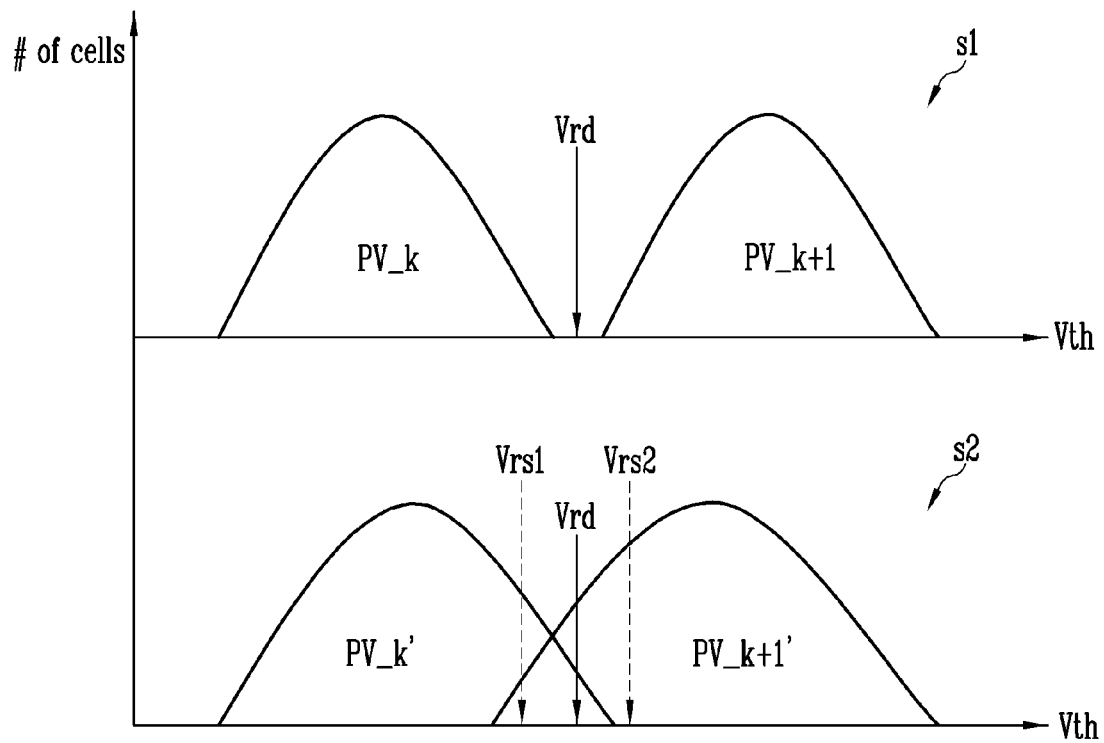
FIG. 3 is a diagram illustrating hard data and soft data.

FIG. 3 is a diagram illustrating the hard data and the soft data.

Referring to FIG. 3, s1 may be an initial threshold voltage distribution of the memory cells. A default read voltage Vrd may be a read voltage that distinguishes two adjacent threshold voltage distributions. For example, the default read voltage Vrd may be a read voltage that distinguishes a threshold voltage distribution having a program state PV_k (k is a positive integer) and a threshold voltage distribution having a program state PV_k+1. The default read voltage may be a hard read voltage.

s2 may be a threshold voltage distribution of a state in which the memory cells are deteriorated. The default read voltage Vrd may be a read voltage that distinguishes a threshold voltage distribution having a program state PV_k' and a threshold voltage distribution having a program state PV_k+1'. Since the memory cells are in a deteriorated state, a soft read operation may be additionally performed to obtain read data having higher reliability. The soft read operation may be a read operation performed using soft read voltages Vrs1 and Vrs2. The soft read voltages Vrs1 and Vrs2 may be determined based on the default read voltage Vrd. For example, the soft read voltages Vrs1 and Vrs2 may be read voltages having a regular interval from the default read voltage Vrd.

In s2, the hard data may be read data obtained using the default read voltage Vrd. The soft data may be read data obtained using the soft read voltages Vrs1 and Vrs2.

Figure 4:
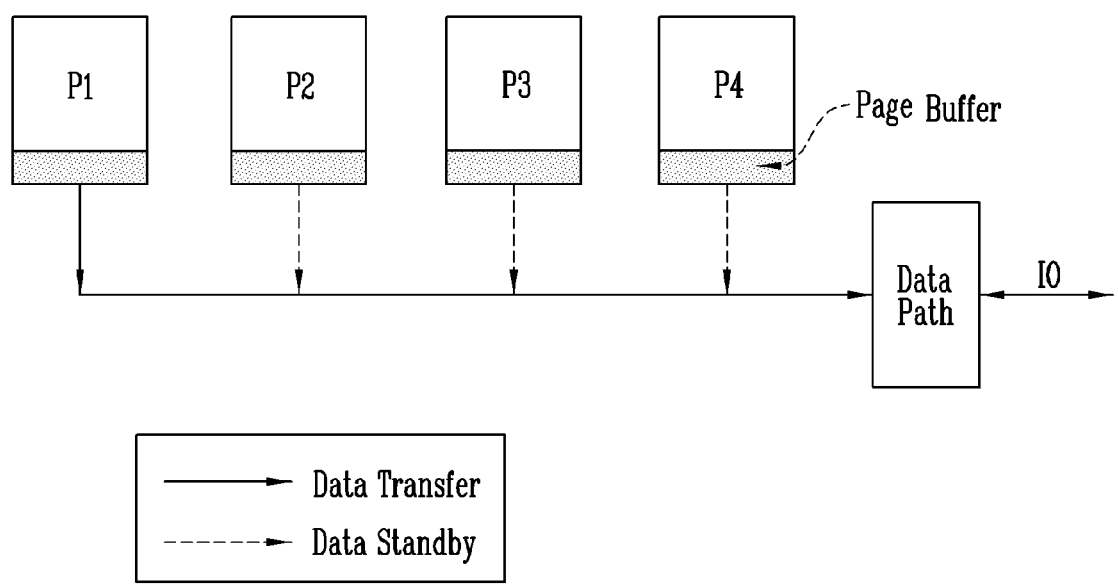
FIG. 4 is a diagram illustrating a flow of data read from a plurality of planes according to an embodiment.

FIG. 4 is a diagram illustrating a flow of data read from a plurality of planes according to an embodiment.

Referring to FIG. 4, a plurality of planes P1 to P4 included in one memory device may share a data path. Data read from the plurality of planes P1 to P4 may be output to an input/output line IO through the data path. The input/output line IO may correspond to the data line DL described with reference to FIG. 2. Conversely, data input through the input/output line IO may be transferred to the plurality of planes P1 to P4 through the data path.

In an embodiment, each plane may include a corresponding page buffer. The page buffer may read data stored in the memory cell of the plane and may output the read data to the input/output line IO.

Since the plurality of planes P1 to P4 share the data path, while the data read from one plane is being output to the input/output line IO through the data path, remaining planes might not output data to the input/output line IO through the data path.

For example, while data read from a first plane P1 is being output to the input/output line IO, second to fourth planes P2 to P4 might not output read data and may wait. The data read from the second to fourth planes P2 to P4 may be sequentially output to the input/output line IO after the data read from the first plane P1 is output to the input/output line IO.

Figure 5:
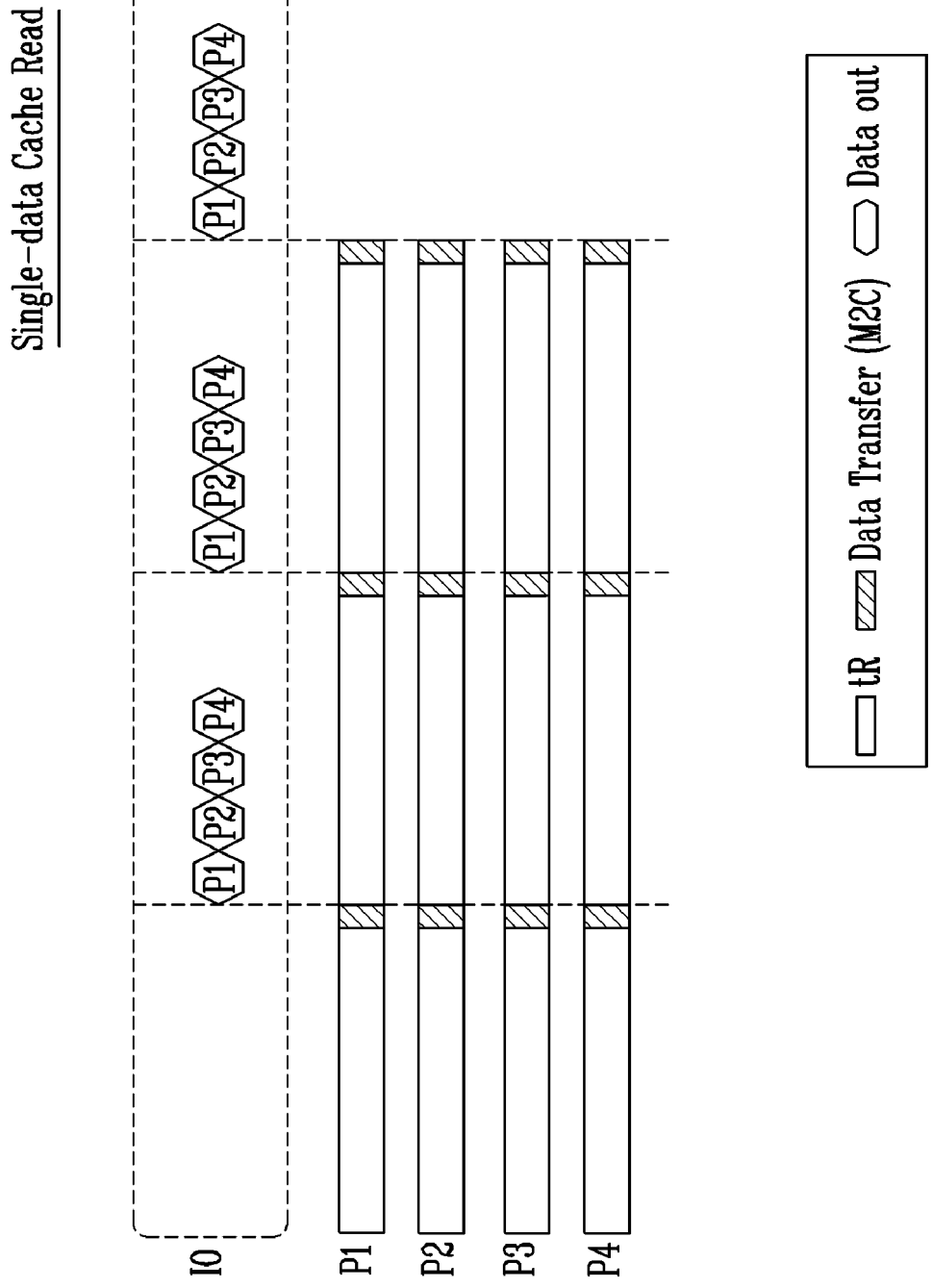
FIG. 5 is a diagram illustrating a read operation on a plurality of planes according to an embodiment.

FIG. 5 is a diagram illustrating a read operation on a plurality of planes according to an embodiment.

Referring to FIG. 5, the plurality of planes P1 to P4 may simultaneously read data. The plurality of planes P1 to P4 may transfer data read from the memory cells to a page buffer of the read and write circuit. The read data transferred to the page buffer may be externally output through the input/output line IO.

As described with reference to FIG. 4, since the plurality of planes P1 to P4 share the data path, the data read from the plurality of planes P1 to P4 may be simultaneously read but may be sequentially output to the input/output line IO.

In FIG. 5, the data read from the first plane P1 to the fourth plane P4 may be sequentially output through the input/output line IO in an order of the first plane P1 to the fourth plane P4. Data read from each plane might not be output simultaneously, and the output order is not limited to the present embodiment.

Figure 6:
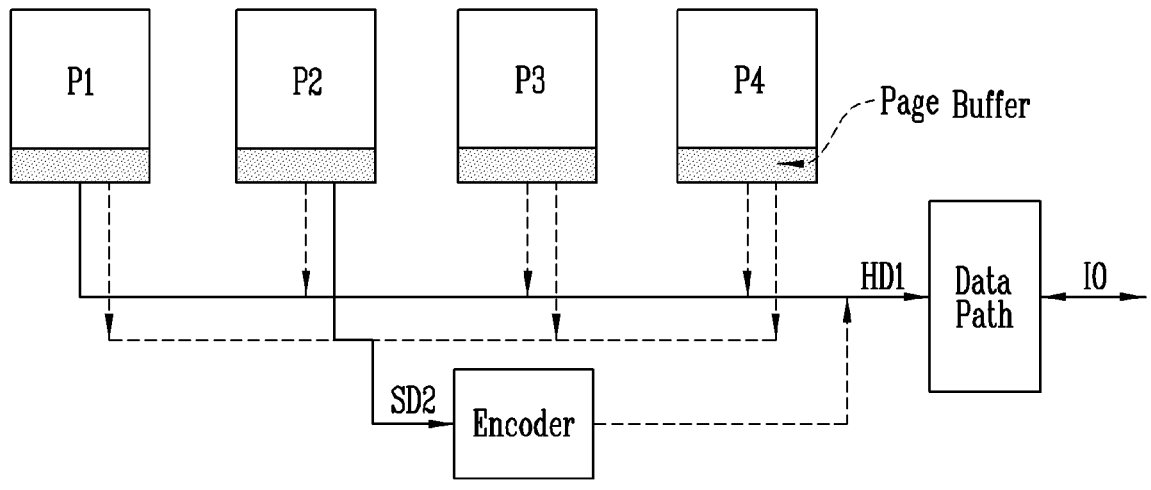
FIG. 6 is a diagram illustrating a flow of data read from a plurality of planes according to an embodiment.

FIG. 6 is a diagram illustrating a flow of data read from a plurality of planes according to an embodiment.

Referring to FIG. 6, as opposed to FIG. 4, data read from the plurality of planes P1 to P4 may be output to the input/output line IO via the encoder, in addition to being directly output to the input/output line IO.

For example, hard data HD1 of the first plane P1 may be output to the input/output line IO through the data path. While the hard data HD1 of the first plane P1 is being output to the input/output line IO, data read from the remaining planes P2 to P4 may wait to output to the input/output line IO.

While the hard data HD1 of the first plane P1 is being output to the input/output line IO, soft data SD2 of the second plane P2 may be transferred to the encoder. The soft data SD2 of the second plane P2 transferred to the encoder may be compressed.

Figure 7:
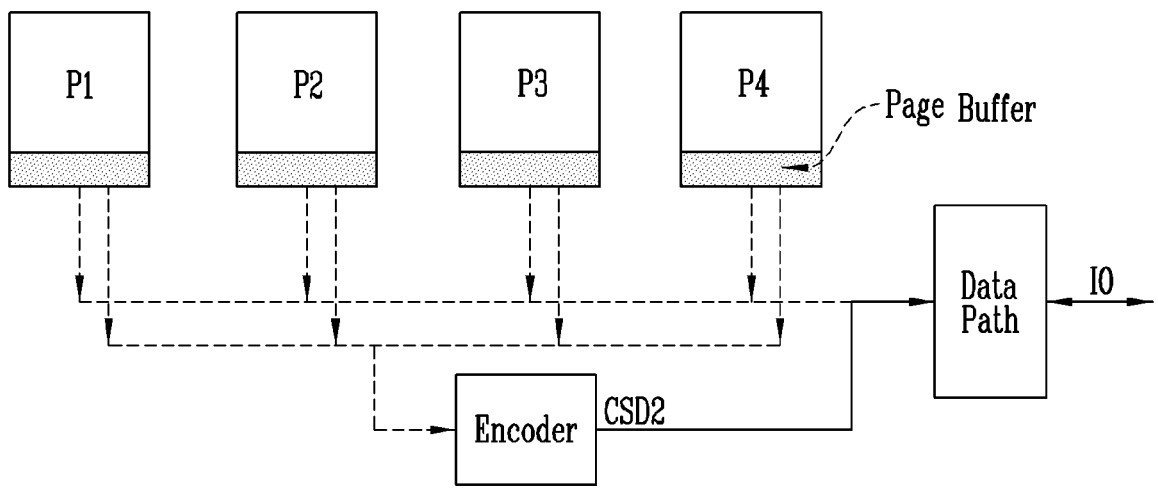
FIG. 7 is a diagram illustrating a flow of data read from a plurality of planes according to an embodiment.

FIG. 7 is a diagram illustrating a flow of data read from a plurality of planes according to an embodiment.

Referring to FIG. 7, compressed soft data CSD2 of the second plane P2, described with reference to FIG. 6, may be output to the input/output line IO through the data path.

Figure 8:
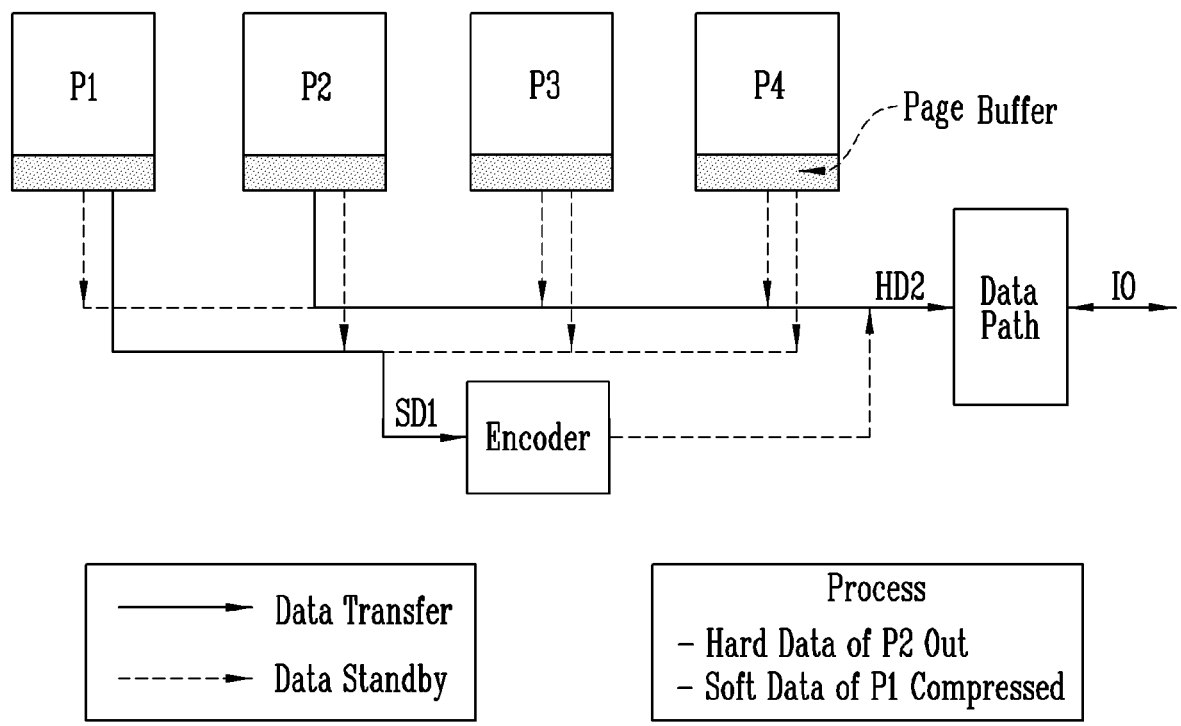
FIG. 8 is a diagram illustrating a flow of data read from a plurality of planes according to an embodiment.

FIG. 8 is a diagram illustrating a flow of data read from a plurality of planes according to an embodiment.

Referring to FIG. 8, hard data HD2 of the second plane P2 may be output to the input/output line IO through the data path. While the hard data HD2 of the second plane P2 is being output to the input/output line IO, the soft data SD1 of the first plane P1 may be transferred to the encoder. The soft data SD1 of the first plane P1 transferred to the encoder may be compressed. The compressed soft data of the first plane P1 may be output to the input/output line IO after the hard data HD2 of the second plane P2 is output.

According to the embodiment described with reference to FIGS. 6 to 8, while the hard data HD1 of the first plane P1 is being output, the soft data SD2 of the second plane P2 may be compressed. After the outputting of the hard data HD1 of the first plane P1 is completed, the compressed soft data CSD2 of the second plane P2 may be output. Thereafter, while the hard data HD2 of the second plane P2 is being output, the soft data SD1 of the first plane P1 may be compressed. After the outputting of the hard data HD2 of the second plane P2 is completed, the compressed soft data of the first plane P1 may be output.

That is, the hard data HD1 of the first plane P1 and the compressed soft data CSD2 of the second plane P2 may be output in a crisscross manner, and then the hard data HD2 of the second plane P2 and the compressed soft data of the first plane P1 may be output in a crisscross manner.

The hard data HD1 and the soft data SD1 of the first plane P1 may be data read from the same page. The hard data may be data read using the default read voltage. The soft data may be data read using the soft read voltage determined based on the default read voltage.

Figure 9:
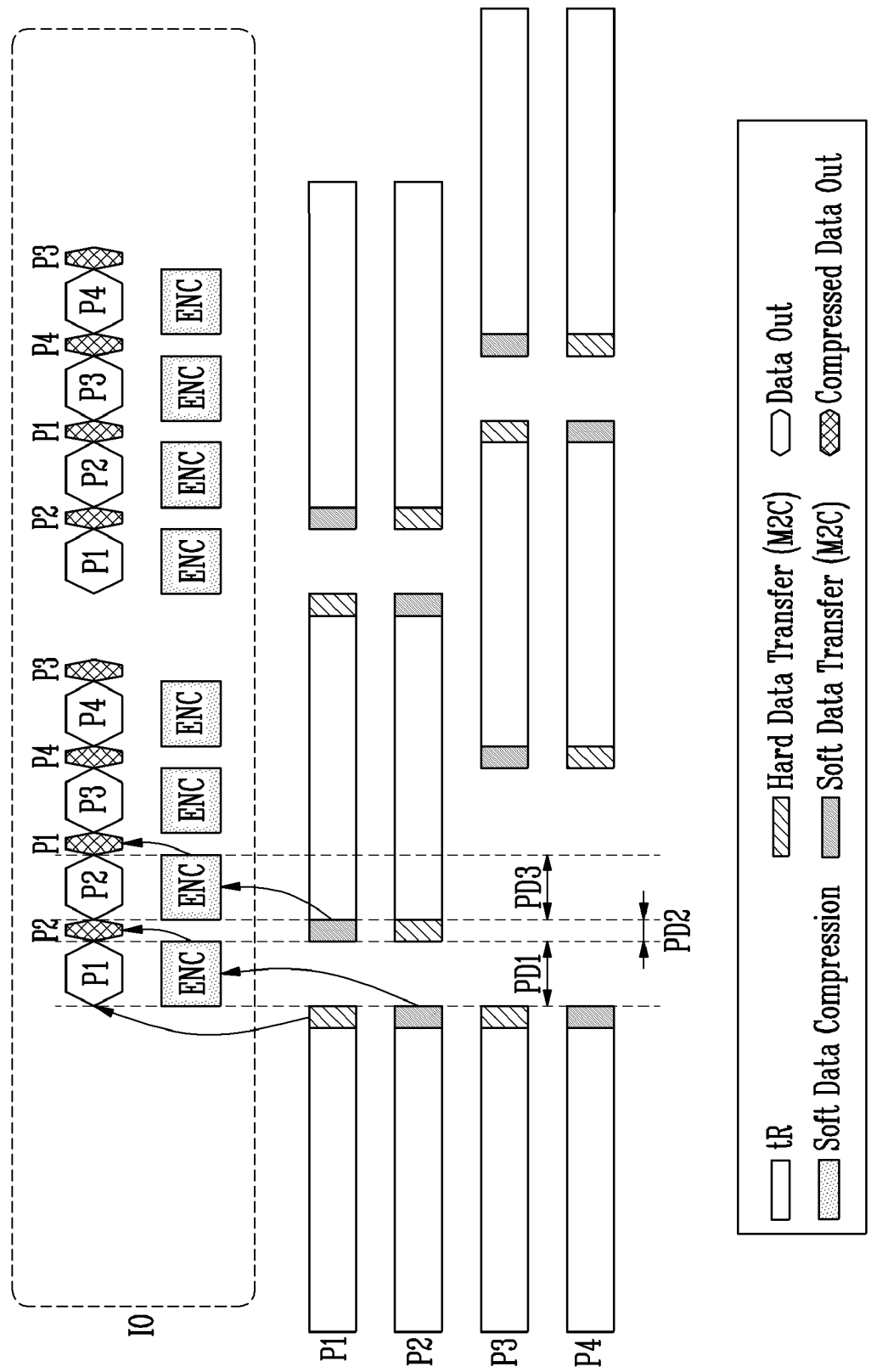
FIG. 9 is a diagram illustrating a read operation on a plurality of planes according to an embodiment.

FIG. 9 is a diagram illustrating a read operation on a plurality of planes according to an embodiment.

Referring to FIG. 9, while the hard data of the first plane P1 is being output through the input/output line IO in a first period PD1, the soft data of the second plane P2 may be compressed by the encoder. An operation of the planes and the encoder in the first period PD1 may be described with reference to FIG. 6.

The soft data of the second plane P2 compressed in a second period PD2 may be output through the input/output line IO. While the compressed soft data of the second plane P2 is being output, the soft data of the first plane P1 and the hard data of the second plane P2 may be transferred from the memory cell to the page buffer of the read and write circuit. The page buffer may include a main latch and a cache latch. Therefore, while data stored in the memory cell is being sensed by the main latch, data stored in the cache latch may be output through the input/output line IO. An operation of sensing current data stored in the memory cell and an operation of outputting previously sensed data in parallel may be referred to as a cache read operation. An operation of the planes and the encoder in the second period PD2 may be described with reference to FIG. 7.

While the hard data of the second plane P2 is being output through the input/output line IO in a third period PD3, the soft data of the first plane P1 may be compressed. An operation of the planes and the encoder in the third period PD3 may be described with reference to FIG. 8.

After the third period PD3, the compressed soft data of the first plane P1 may be output to the input/output line IO.

Figure 10:
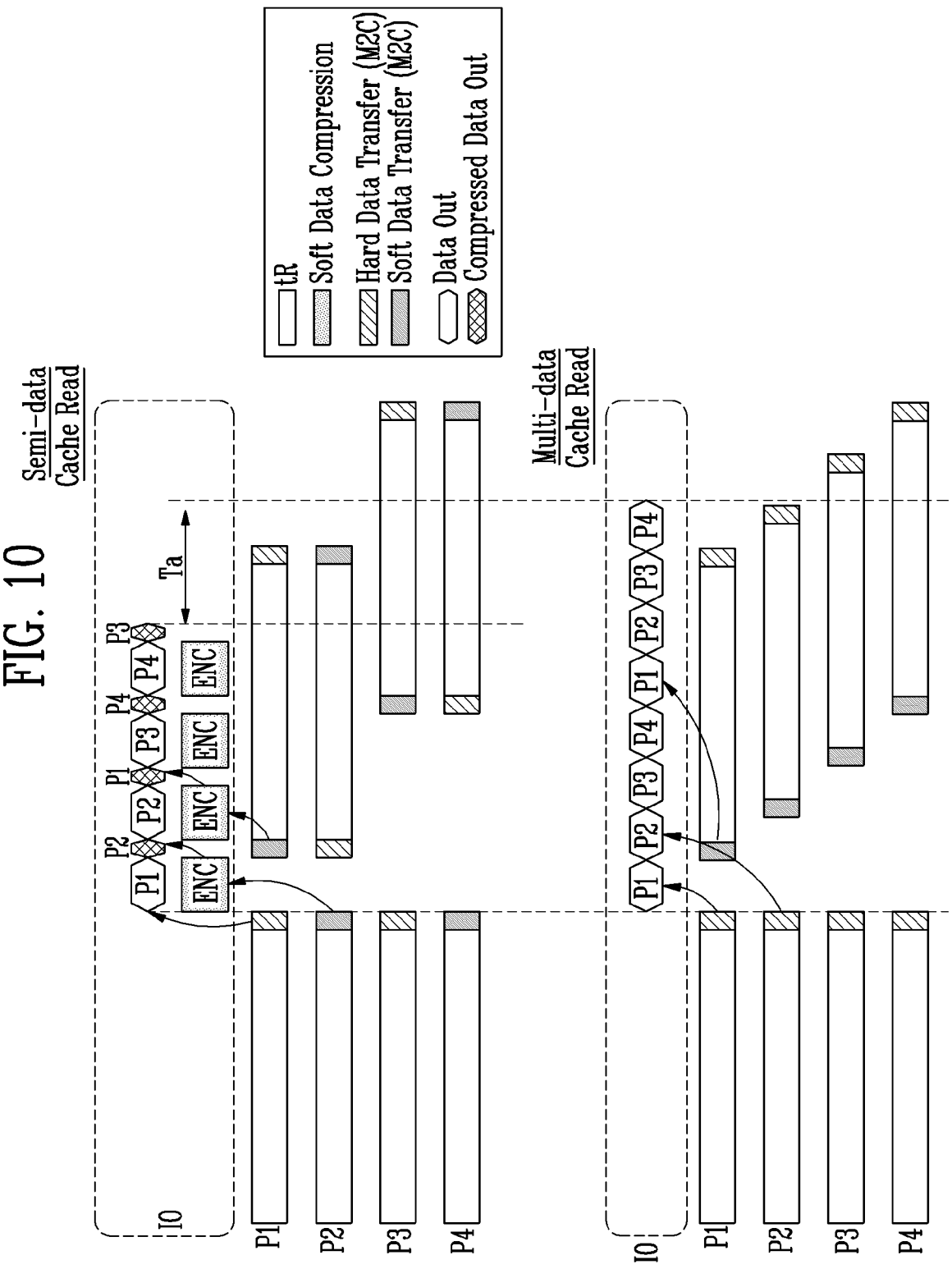
FIG. 10 is a diagram for comparing read operations on a plurality of planes according to an embodiment.

FIG. 10 is a diagram for comparing read operations on a plurality of planes according to an embodiment.

Referring to FIG. 10, a semi-data cache read operation may be described similarly to the read operation described with reference to FIG. 9.

A multi-data cache read operation may be an operation of outputting the hard data read from the first plane P1 and the soft data read from the second plane P2 to the input/output line IO in a crisscross manner and then outputting the hard data of the second plane P2 and the soft data of the first plane P1 to the input/output line IO in a crisscross manner.

In FIG. 10, the semi-data cache read operation may compress the soft data of the plane and output the compressed soft data to the input/output line IO, differently from the multi-data cache read operation. Since the semi-data cache read operation compresses the soft data and outputs the compressed soft data to the input/output line IO, a read operation time may be reduced by Ta compared to the multi-data cache read operation.

Figure 11:
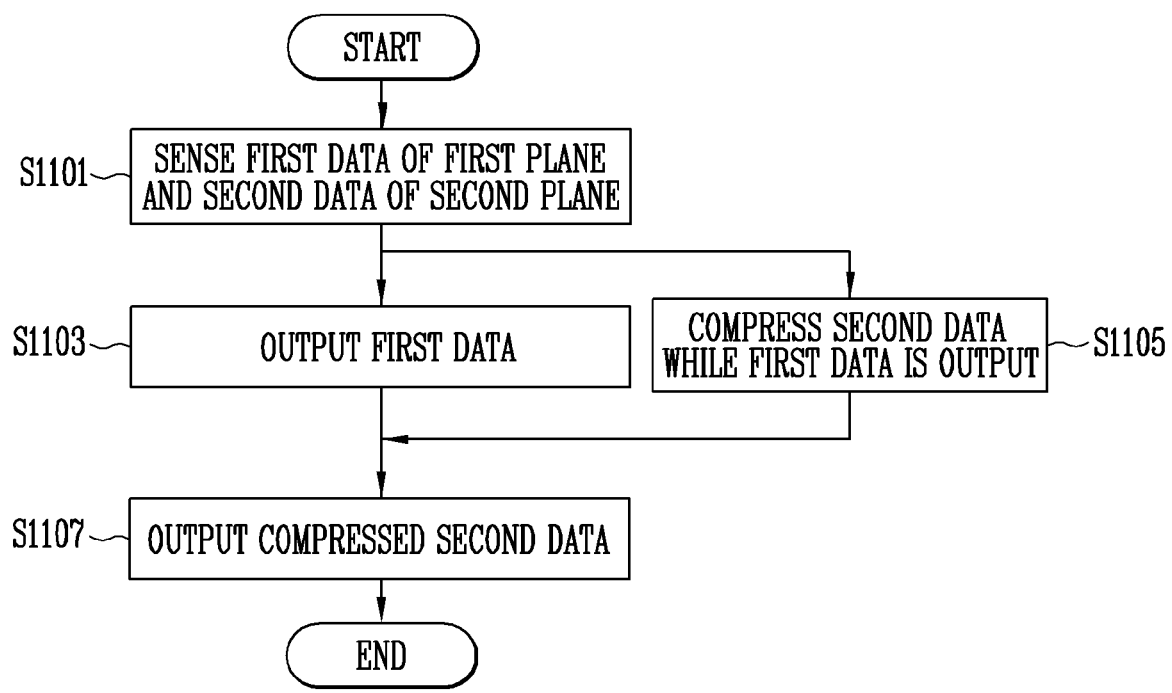
FIG. 11 is a flowchart illustrating an operation of a memory device according to an embodiment.

FIG. 11 is a flowchart illustrating an operation of a memory device according to an embodiment.

Referring to FIG. 11, in step S1101, the memory device may sense the first data of the first plane and the second data of the second plane. In an embodiment, when the first data is the hard data, the second data may be the soft data. When the first data is the soft data, the second data may be the hard data.

In step S1103, the memory device may output the first data to the external device.

In step S1105, the memory device may compress the second data while the first data is being output. In an embodiment, a period in which steps S1103 and S1105 are performed may overlap.

In step S1107, the memory device may output the compressed second data to the external device.

Figure 12:
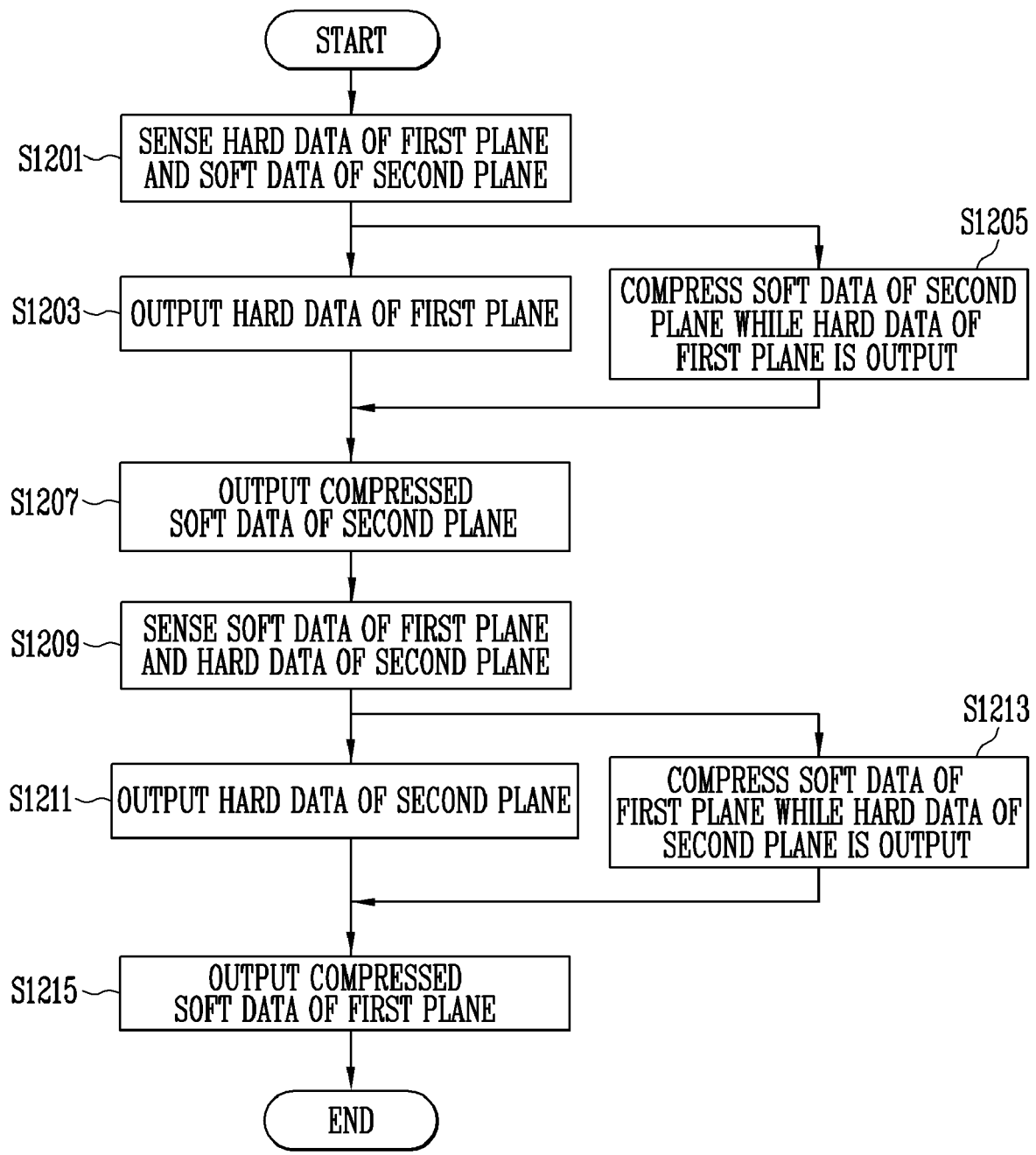
FIG. 12 is a flowchart illustrating an operation of a memory device according to an embodiment.

FIG. 12 is a flowchart illustrating an operation of a memory device according to an embodiment.

Referring to FIG. 12, in step S1201, the memory device may sense the hard data of the first plane and the soft data of the second plane.

In step S1203, the memory device may output the hard data of the first plane to the external device.

In step S1205, the memory device may compress the soft data of the second plane while the hard data of the first plane is being output.

In step S1207, the memory device may output the compressed soft data of the second plane to the external device.

In step S1209, the memory device may sense the soft data of the first plane and the hard data of the second plane.

In step S1211, the memory device may output the hard data of the second plane to the external device.

In step S1213, the memory device may compress the soft data of the first plane while the hard data of the second plane is being output.

In step S1215, the memory device may output the compressed soft data of the first plane to the external device.

Figure 13:
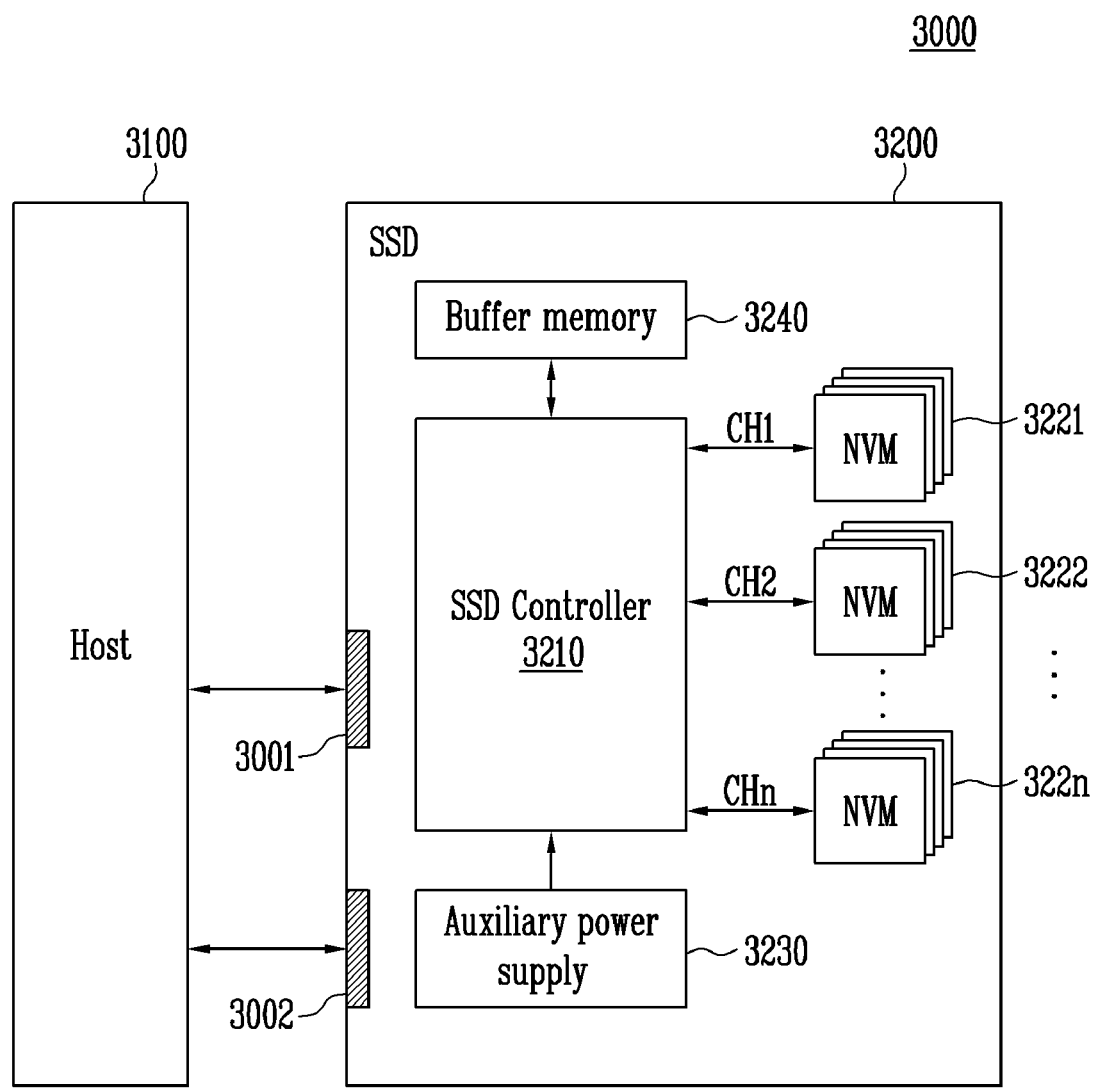
FIG. 13 is a block diagram illustrating a solid state drive (SSD) system to which a storage device according to an embodiment of the present disclosure is applied.

FIG. 13 is a block diagram illustrating a solid state drive (SSD) system to which a storage device according to an embodiment of the present disclosure is applied.

Referring to FIG. 13, the SSD system 3000 may include a host 3100 and an SSD 3200. The SSD 3200 may exchange a signal with the host 3100 through a signal connector 3001 and receives power through a power connector 3002. The SSD 3200 may include an SSD controller 3210, a plurality of flash memories 3221 to 322n, an auxiliary power device 3230, and a buffer memory 3240.

According to an embodiment of the present disclosure, the SSD controller 3210 may perform the function of the memory controller 200 described with reference to FIG. 1.

The SSD controller 3210 may control the plurality of flash memories 3221 to 322n in response to the signal received from the host 3100. For example, the signal may be signals based on an interface between the host 3100 and the SSD 3200. For example, the signal may be a signal defined by at least one of interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power device 3230 may be connected to the host 3100 through the power connector 3002. The auxiliary power device 3230 may receive the power from the host 3100 and may charge the power. The auxiliary power device 3230 may provide power of the SSD 3200 when power supply from the host 3100 is not smooth. For example, the auxiliary power device 3230 may be positioned in the SSD 3200 or may be positioned outside the SSD 3200. For example, the auxiliary power device 3230 may be positioned on a main board and may provide auxiliary power to the SSD 3200.

The buffer memory 3240 may operate as a buffer memory of the SSD 3200. For example, the buffer memory 3240 may temporarily store data received from the host 3100 or data received from the plurality of flash memories 3221 to 322n, or the buffer memory 3240 may temporarily store meta data (for example, a mapping table) of the flash memories 3221 to 322n. The buffer memory 3240 may include a volatile memory, such as a DRAM, an SDRAM, a DDR SDRAM, an LPDDR SDRAM, and a GRAM, or a nonvolatile memory, such as an FRAM, a ReRAM, an STT-MRAM, and a PRAM.

What is claimed is:

1. A memory device comprising:
a first plane and a second plane;
a data input/output circuit configured to output data read from the first plane and the second plane; and
an encoder configured to compress second data read from the second plane while first data read from the first plane is output;
wherein the data input/output circuit outputs the compressed second data consecutively after outputting the first data.

2. The memory device of claim 1, wherein the first data is hard data obtained using a default read voltage, and
wherein the second data is soft data obtained using a soft read voltage determined based on the default read voltage.

3. The memory device of claim 2, wherein, while fourth data read from the second plane is output, the encoder compresses third data read from the first plane; and
wherein the third data is the soft data corresponding to the first data and the fourth data is the hard data corresponding to the second data.

4. The memory device of claim 3, wherein the data input/output circuit outputs the compressed third data after outputting the fourth data.

5. The memory device of claim 1, wherein the data input/output circuit transmits the first data and the second data to an external controller.

6. The memory device of claim 3, further comprising a read and write circuit configured to sense the first data and the second data from the first plane and the second plane.

7. The memory device of claim 6, wherein the read and write circuit senses the third data and the fourth data from the first plane and the second plane, respectively, while the compressed second data is output.

8. The memory device of claim 7, wherein the read and write circuit comprises:
a first page buffer group configured to sense data stored in the first plane; and
a second page buffer group configured to sense data stored in the second plane, and
the first page buffer group senses the first data from the first plane while the second page buffer group senses the second data from the second plane.

9. The memory device of claim 8, wherein the first page buffer group comprises:
a main latch configured to sense the first data stored in a selected page in the first plane; and
a cache latch configured to store the first data received from the main latch and output the first data to the data input/output circuit.

10. The memory device of claim 9, wherein the main latch senses the third data stored in the selected page when the first data is stored in the cache latch.

11. A method of operating a memory device, the method comprising:
outputting first data read from a first plane;
compressing second data read from a second plane while the first data is output; and
outputting the compressed second data consecutively after outputting the first data.

12. The method of claim 11, further comprising:
outputting fourth data read from the second plane;
compressing third data read from the first plane while the fourth data is output; and
outputting the compressed third data after outputting the fourth data
wherein the third data corresponds to the first data and the fourth data corresponds to the second data.

13. The method of claim 12, wherein the first data and the fourth data are hard data obtained using a default read voltage, and
wherein the second data and the third data are soft data obtained using a soft read voltage determined based on the default read voltage.

14. The method of claim 11, wherein the first data and the second data are transmitted to an external controller.

15. The method of claim 12, further comprising:
sensing the first data and the second data from the first plane and the second plane.

16. The method of claim 15, further comprising sensing the third and fourth data from the first plane and the second plane, respectively, while the second data is output.

17. The method of claim 12, wherein the compressed third data is output consecutively after outputting the fourth data.

18. The method of claim 12, wherein the fourth data is output consecutively after outputting the second data.

19. The method of claim 15, further comprising:
sensing a fifth data from a third plane while the first data is sensed,
wherein the fifth data is output after outputting the compressed third data.

20. The method of claim 12, wherein the third data is sensed when the first data is stored in the cache latch.

\* \* \* \* \*